(12) United States Patent
Pham

(10) Patent No.: US 8,863,211 B2
(45) Date of Patent: *Oct. 14, 2014

(54) METHOD AND SYSTEM FOR PERFORMANCE METRIC ANALYSIS OF VIDEO ASSETS

(71) Applicant: AT&T Intellectual Property I, L.P., Atlanta, GA (US)

(72) Inventor: Hung John Pham, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/689,584

(22) Filed: Nov. 29, 2012

(65) Prior Publication Data

US 2013/0086604 A1 Apr. 4, 2013

Related U.S. Application Data

(63) Continuation of application No. 12/958,211, filed on Dec. 1, 2010, now Pat. No. 8,332,900.

(51) Int. Cl.
| | |
|---|---|
| H04N 7/173 | (2011.01) |
| H04N 21/24 | (2011.01) |
| H04H 60/31 | (2008.01) |
| G06F 11/00 | (2006.01) |
| G01R 31/08 | (2006.01) |

(52) U.S. Cl.
CPC .............. *H04N 21/24* (2013.01); *H04H 60/31* (2013.01)
USPC ........................... 725/107; 370/241; 370/252

(58) Field of Classification Search
USPC ........................................................ 725/107
See application file for complete search history.

(56) References Cited

U.S. PATENT DOCUMENTS

| | | |
|---|---|---|
| 6,965,895 B2 | 11/2005 | Smith et al. |
| 7,592,912 B2 | 9/2009 | Hasek et al. |
| 7,688,754 B2 | 3/2010 | Williams |
| 7,693,081 B1 | 4/2010 | Zriny et al. |
| 7,733,794 B2 | 6/2010 | Damm |
| 7,826,383 B2 | 11/2010 | Savard et al. |
| 7,872,988 B1 | 1/2011 | Hatley et al. |
| 7,890,985 B2 | 2/2011 | Bowra et al. |
| 2003/0061212 A1 | 3/2003 | Smith et al. |
| 2003/0121053 A1 | 6/2003 | Honda |
| 2007/0047542 A1 | 3/2007 | Thukral |
| 2009/0064251 A1 | 3/2009 | Savoor et al. |
| 2009/0100492 A1 | 4/2009 | Hicks, III et al. |
| 2009/0106809 A1 | 4/2009 | Rahman |
| 2009/0168658 A1 | 7/2009 | Russell et al. |
| 2010/0150018 A1 | 6/2010 | Beattie, Jr. et al. |
| 2010/0271488 A1 | 10/2010 | Garcia et al. |
| 2011/0088070 A1 | 4/2011 | Pham et al. |
| 2011/0090346 A1 | 4/2011 | Pham et al. |

*Primary Examiner* — Chris Parry
(74) *Attorney, Agent, or Firm* — Jackson Walker L.L.P.

(57) ABSTRACT

A method and system for monitoring video assets provided by a multimedia content distribution network (MCDN) includes an expert test monitoring platform (ETMP) configured to emulate MCDN client systems at a facility of an MCDN service provider. The ETMP may be used to obtain remote control response metrics, along with internal performance data, for client systems in the ETMP. Historical metrics and historical data may be logged along with the release version for the client systems, which may then be used to correlate operational performance when analyzing client system characteristics.

20 Claims, 7 Drawing Sheets

METHOD AND SYSTEM FOR PERFORMANCE METRIC ANALYSIS OF VIDEO ASSETS

The present patent application is a continuation of U.S. patent application Ser. No. 12/958,211, filed Dec. 1, 2010, the entirety of which is hereby incorporated by reference.

FIELD OF THE DISCLOSURE

The present disclosure relates to baseband video monitoring, and in particular to performance characterization of baseband video assets.

BACKGROUND

Users of a multimedia content distribution network (MCDN) may be provided a wide range of video assets to select from. A service provider operating the MCDN may be faced with various quality control issues related to the video assets and the performance of MCDN equipment. In a conventional MCDN architecture, feedback about MCDN performance is typically gleaned from user support requests and/or support visits to user locations.

DETAILED DESCRIPTION

Figure 1:
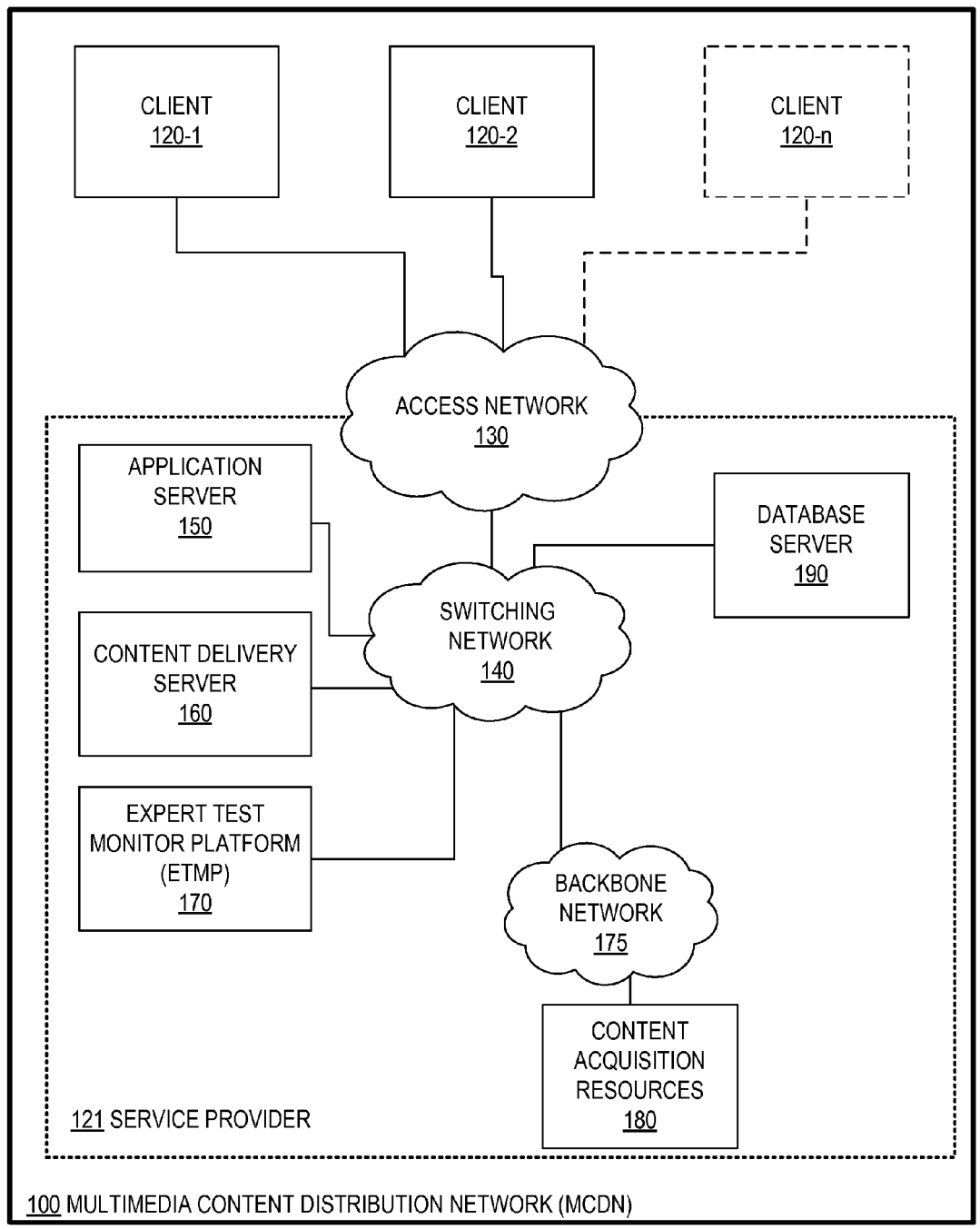
FIG. 1 is a block diagram of selected elements of an embodiment of an MCDN.

In one aspect, a disclosed method for monitoring an output channel of a multimedia content distribution network (MCDN) includes receiving user input selecting a multimedia handling device (MHD) from a plurality of MHDs installed in an expert test monitoring platform (ETMP) of the MCDN, acquiring a baseband video signal output by the selected MHD, and receiving second user input for controlling the baseband video signal output presented by the selected MHD. During the acquiring operation, a series of video frames may be generated from the video signal. The method may also include assigning respective timestamps to at least some of the generated video frames. Additionally, sending a remote control command corresponding to the second user input to the selected MHD, and analyzing the video frames and the respective timestamps to determine a remote control response metric for the video signal output may also be included. The remote control response metric may be indicative of a response time of the selected MHD to the remote control command. The second user input may be received when the MHD is displaying an electronic program guide (EPG) provided by the MCDN. The multimedia output presented by the selected MHD may include a portion of the EPG, broadcast programs, live feed programs, video-on-demand (VOD) programs, pay-per-view (PPV) programs, previously recorded programs, Internet content, or a combination thereof.

In certain embodiments, the method may further include storing a current value of the remote control response metric to an ETMP database, and comparing the current value of the remote control response metric to other historical values for the remote control response metric to determine whether the selected MHD is operating normally (i.e., within a pre-determined range). The method operation of analyzing may further include repeating the sending of the remote control command for a number of iterations, and determining an average of the remote control response metric over the number of iterations. The method may also include querying the ETMP database for historical metrics and historical data for the selected MHD, and analyzing the historical metrics and the historical data to correlate a response time to utilized processing resources for the selected MHD. The historical metrics may include the remote control response metric.

In another aspect, a disclosed computerized test system for monitoring output channels from an MCDN includes a processor configured to access memory media and a network adapter accessible to the processor. The memory media may include instructions executable by the processor to receive user input identifying a remote control command for an MHD included in an ETMP and to send the remote control command to the MHD. The ETMP may include a plurality of MHDs configured to output MCDN program channels, a network-based remote control unit configured to receive network commands and remotely control individual ones of the plurality of MHDs, and an ETMP network coupled to the network adapter and the network-based remote control unit. The instructions may include instructions to acquire a baseband video signal output by the MHD. The signal may include a series of video frames and respective timestamps associated with the video frames. The instructions may still further include instructions to analyze the video frames and the respective timestamps to determine a video performance metric indicative of a response time of the selected MHD to the remote control command.

In some embodiments, the instructions may also include instructions to capture the user input to an ETMP script, and save the captured ETMP script at an ETMP database coupled to the ETMP network. The instructions may further include instructions to determine the video performance metric by determining an average value over a number of iterations. The user input may include a duration over which the video frames are analyzed.

In particular embodiments, the instructions to save the captured ETMP script may further include instructions to save the video performance metric at the ETMP database. The instructions may also include instructions to store internal performance data for the selected MHD to the ETMP database, and store an indication of a release version of the selected MHD to the ETMP database. The internal performance data may be indicative of processing resources utilized by the selected MHD. The instructions may also include instructions to query the ETMP database for historical video metrics and historical performance data for the selected MHD, and query the ETMP database for release version indications for the selected MHD associated with the historical video metrics. The historical video metrics may include the video performance metric. The instructions may also include instructions to analyze the historical video metrics and the historical performance data to determine a correlation with the release version indications.

In yet another aspect, disclosed computer readable memory media for monitoring output from an MCDN include instructions executable by the processor. The instructions may acquire a baseband video signal output by an MHD configured to output MCDN channels, receive user input for controlling multimedia output presented by the selected MHD, and send a remote control command corresponding to the user input to the selected MHD. A series of video frames and respective timestamps associated with the video frames may be generated when the baseband video signal is acquired. The instructions may further get a first timestamp when the remote control command is sent, and monitor the baseband video signal for an expected video frame corresponding to the remote control command. When the expected video frame is detected, the instructions may get a second timestamp associated with the expected video frame, and record a response time for the MHD corresponding to a difference between the second timestamp and the first timestamp. The MHD may be configured as a unit-under-test (UUT) within an ETMP of the MCDN.

In given embodiments, the instructions may request access to the UUT from an ETMP master controller. In response to receiving access to the UUT, a first network command to power on the UUT via a network-based power controller may be sent, a second network command to select an output MCDN channel of the UUT via a network-based remote control may be sent, and send a third network command to route the output channel of the UUT may be sent. The instructions may also include instructions to calculate the response time as an average value based on a plurality of iterations of getting respective first and second timestamps. The user input may include a duration for monitoring the baseband video signal. The instructions may also include instructions to send the response time to an ETMP database for storage, send internal performance data for the selected MHD to the ETMP database for storage, and send an indication of a release version of the selected MHD to the ETMP database for storage. The internal performance data may be indicative of processing resources utilized by the selected MHD. The instructions may still further include instructions to query the ETMP database for historical performance metrics for the selected MHD, and query the ETMP database for release version indications for the selected MHD associated with the historical performance metrics. The historical performance metrics may include the response time. The instructions may also analyze the historical performance metrics to determine a correlation between values of the response time and the release version indications.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of an MCDN 100 including ETMP 170, which may be used for monitoring an output channel from MCDN 100 and to characterize performance of MCDN devices, as will be described in detail herein. Although multimedia content is not limited to television (TV), VOD, or PPV programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 175, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 175.

In FIG. 1, backbone network 175 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an EPG, such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming." Live programs that are broadcast without substantial delay are referred to herein as "live feed programs."

Acquired content is provided to content delivery server 160 via backbone network 175 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. Application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is ETMP 170, which represents a facility for test monitoring of output channels of MCDN 100. ETMP 170 may include infrastructure for emulating functionality associated with clients 120 for the purpose of capturing and analyzing output video and/or audio signals in order to test the performance and quality of video assets provided by MCDN 100 (see also FIG. 2).

It is noted that clients 120 may include network appliances collectively referred to herein as customer premises equipment (CPE). In various embodiments, CPE may include the following devices: a gateway (GW), an MHD (see also FIG. 3), and a display device (not shown in FIG. 1). Any combination of the GW, the MHD, and the display device may be integrated into a single physical device. Thus, for example, CPE might include a single physical device that integrates the GW, MHD, and a display device. As another example, an MHD may be integrated into a display device, while the GW may be housed within a physically separate device.

The GW may provide connectivity for client 120 to access network 130. The GW may provide an interface and conversion function between access network 130 and a client-side local area network (LAN). The GW may include elements of a conventional DSL or cable modem. In some embodiments, the GW may further include routing functionality for routing multimedia content, conventional data content, or a combination of both in compliance with IP or another network layer protocol. In some embodiments, the LAN may encompass or represent an IEEE 802.3 (Ethernet) LAN, an IEEE 802.11-type (WiFi) LAN, or a combination thereof. The GW may still further include WiFi or another type of wireless access point to extend the LAN to wireless-capable devices in proximity to the GW. The GW may also provide a firewall (not depicted) between clients 120 and access network 130.

Clients 120 may further include a display device or, more simply, a display (not shown in FIG. 1). The display may be implemented as a TV, a liquid crystal display screen, a computer monitor, or the like. Display 126 may comply with a display standard for computer monitors and/or TV displays. Standards for computer monitors include analog standards such as video graphics array (VGA), extended graphics array (XGA), etc., or digital standards such as digital visual interface (DVI) and high definition multimedia interface (HDMI), among others. A TV display may comply with standards such as National Television System Committee (NTSC), Phase Alternating Line (PAL), or another suitable standard. The display may include one or more integrated speakers to play audio content.

Clients 120 may further include respective remote control (not shown in FIG. 1), which is configured to control the operation of MHD by means of a user interface, such as EPG 316 (see FIG. 3) that may be displayed by the display. The remote control of client 120 may be operable to communicate requests or commands wirelessly to the MHD using infrared (IR) or radio frequency (RF) signals. MHDs may also receive requests or commands via buttons located on side panels of MHDs.

The MHD may be enabled and configured to process incoming multimedia signals to produce audio and visual signals suitable for delivery to the display and any optional external speakers. Incoming multimedia signals received by the MHD may be compressed and/or encrypted, digital or analog, packetized for delivery over packet-switched embodiments of access network 130 or modulated for delivery over cable-based access networks. In some embodiments, the MHD may be implemented as a stand-alone set top box suitable for use in a co-axial or IP-based MCDN.

Figure 2:
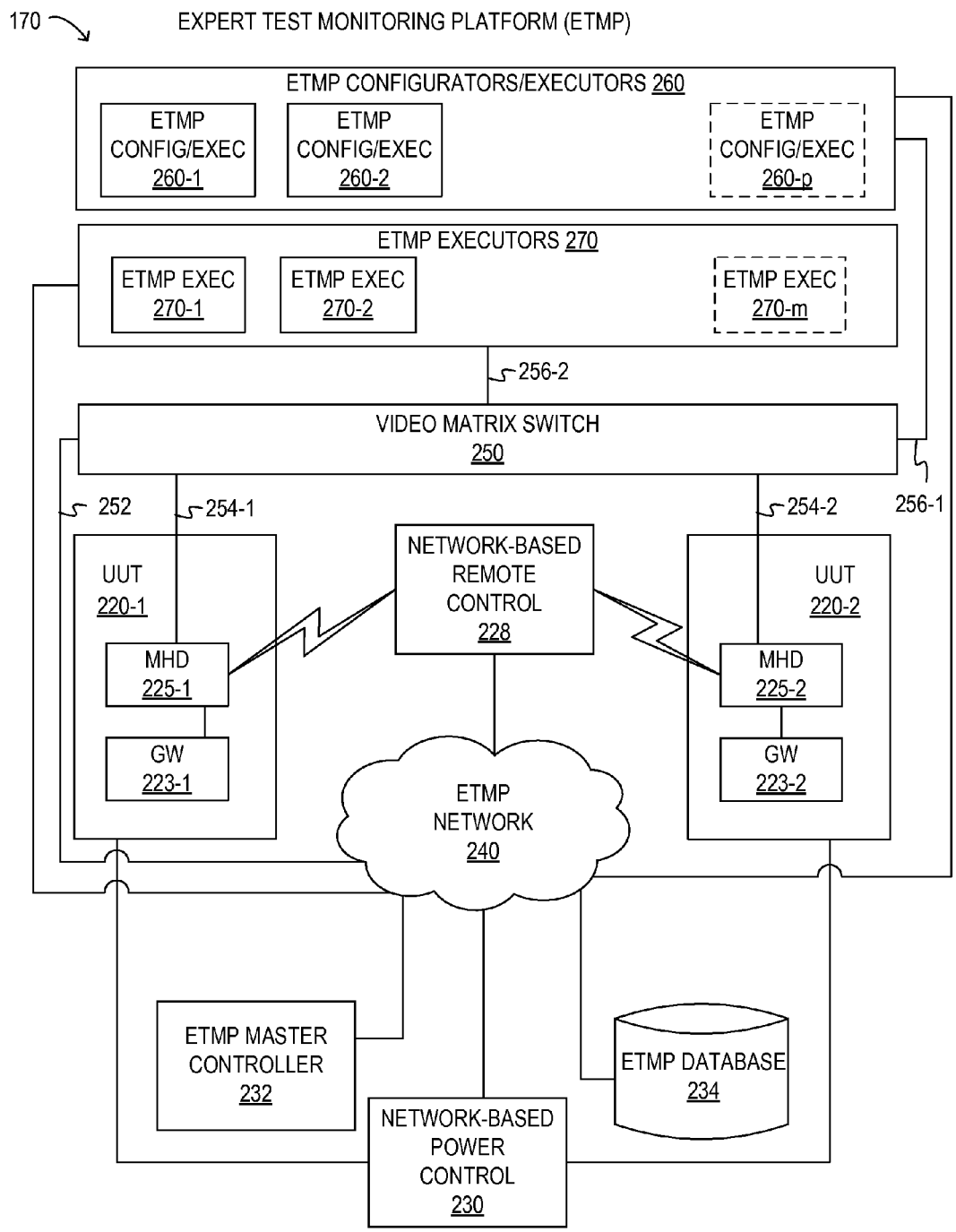
FIG. 2 is a block diagram of selected elements of an embodiment of an expert test monitoring platform (ETMP)

Referring now to FIG. 2, a block diagram illustrating selected elements of an embodiment of ETMP 170 is presented. The embodiment depicted in FIG. 2 is an exemplary implementation of ETMP 170 for illustrative purposes. It will be understood that, in different embodiments, elements depicted in FIG. 2 may be modified, rearranged, or omitted. For example, in certain embodiments, ETMP network 240 may refer to portions of a larger, external network system (not shown in FIG. 2). In various embodiments, video matrix switch 250 may represent either an automatic switch or a manual switch or a combination thereof. Other substitutions may be implemented in given embodiments of ETMP 170, as desired.

In FIG. 2, ETMP network 240 is shown providing communication links between various elements in ETMP 170, as will now be described in detail. It is noted that ETMP network 240 may also link ETMP 170 to switching network 140 (not shown in FIG. 2, see FIG. 1). Also shown in FIG. 2 are UUTs 220, which may represent similar elements as CPE associated with clients 120, as described previously. In FIG. 1, UUT 220-1 and 220-2 are shown as two exemplary instances for clarity, while it will be understood that ETMP 170 may include different numbers of UUT 220 in various embodiments. UUT 220 may represent an embodiment of client 120 that is implemented in ETMP 170 for the purposes of testing and analyzing output channels of MCDN 100. Accordingly, UUT 220 may provide similar functionality as client 120, but may omit certain elements that are not relevant for testing purposes (see also FIG. 3). For example, UUT 220 may not include a display. In FIG. 2, UUT 220-1 may include MHD 225-1 and GW 223-1, as described previously (see also FIG. 3), while UUT 220-2 may include MHD 225-2 and GW 223-2.

As depicted in FIG. 2, network-based remote control 228 may represent a means to generate remote control signals for reception by MHD 225. Network-based remote control 228 may be configured to receive network commands that are addressed to a specific remote control port (not shown in FIG. 2) associated with a particular MHD 225, such as MHD 225-1. In this manner, network-based remote control 228 may provide functionality to emulate a remote control operated by a user of client 120 (see FIG. 1). Network commands sent to network-based remote control 228 may originate from a test operator of ETMP 170 or from an ETMP test program that is configured to execute in an automated manner.

Also shown in FIG. 2, network-based power control 230 may represent a means to control (i.e., switch) power to UUT 220, including to MHD 225, GW 223, and/or other elements. Network-based power control 230 may be configured to receive network commands that are addressed to a specific power circuit associated with a particular UUT 220. In this manner, network-based power control 230 may provide programmable switching capability to power down and power up UUT 220 and associated elements. Network commands sent to network-based power control 230 may originate from a test operator of ETMP 170 or from an ETMP test program, as will be described in detail below.

On the operational side of ETMP 170 in FIG. 2 are ETMP configurators/executors 260 and ETMP executors 270. A "configurator" refers to a module that allows an operator (not shown in FIG. 2) to perform individual test operations, generate test sequences, obtain test results, and otherwise manually operate a test facility. An ETMP configurator is therefore specific to ETMP 170. An "executor" refers to a module that is configured to execute previously stored test sequences, also referred to as test programs, jobs, batch files, scripts, etc., comprised of individual test operations or test instructions. An ETMP executor is specific to ETMP 170. Both ETMP configurators/executors 260 represent configurator modules that are executable on a computing device coupled to ETMP 170, which also may include executor functionality. ETMP executors 270 represent executor modules that do not include configurator functionality. ETMP 170 may include ETMP configurators/executors 260-1, 260-2 and so on, up to an arbitrary p-number of ETMP configurators/executors 260-$p$. ETMP 170 may include ETMP executors 270-1, 270-2 and so on, up to an arbitrary m-number of ETMP executors 270-$m$.

Additionally, in FIG. 2, video matrix switch 250 is shown providing connectivity between MHDs 225 and ETMP configurators/executors 260 and ETMP executors 270. Video matrix switch 250 may receive network commands via link 252 to ETMP network 240. Video matrix switch 250 may couple to output baseband video signals from MHD 225 via links 254. Specifically, video matrix switch 250 may receive an output signal from MHD 225-1 via link 254-1 and from MHD 225-2 via link 254-2. Furthermore, video matrix switch 250 may be coupled to inputs of ETMP configurators/executors 260 via link 256-1 and to inputs of ETMP executors 270 via link 256-2. It is noted that links 256 may represent multiple connections that form one edge of a switching matrix, while links 254 represent another edge of the switching matrix. It is further noted that link 254 may represent a communication port, such as an addressable network port, that is operable to connect to MHD 225.

Also shown in FIG. 2 is ETMP master controller 232, which represents a functional module configured to manage access to resources of ETMP 170. ETMP master controller 232 may be configured to receive control requests for access to ETMP resources (such as UUTs 220 and associated elements in ETMP 170) from ETMP configurators or executors. For example, ETMP executor 270-1 may send a control request for access to UUT 220-2 from ETMP master controller 232, which may then grant the control request and assign control to ETMP executor 270-1. Subsequent requests for access to UUT 220-2 may then be denied by ETMP master controller 232, so long as ETMP executor 270-1 is assigned control of UUT 220-2. In certain embodiments, ETMP master controller 232 may take a priority of an ETMP test program into consideration when granting control requests to access ETMP resources and may terminate a currently assigned control relationship in favor of a higher priority one. In one embodiment, a scheduled ETMP test program may be assigned to ETMP executor 270-2 when a scheduled start time approaches the current time. The scheduled ETMP test program may be designated for UUT 220-2, which may be assigned for control by ETMP configurator/executor 260-1. In such an instance, ETMP master controller 232 may be configured to reassign control of UUT 220-2 to ETMP executor 270-2 and terminate the assignment of ETMP configurator/executor 260-1. A user of ETMP configurator/executor 260-1 may be given a warning by ETMP master controller 232 that a scheduled test is about to begin on UUT 220-2 and that a presently active test session will soon be terminated.

In FIG. 2, ETMP database 234 may represent a repository for data and information associated with ETMP 170. For example, ETMP database 234 may store configuration information representing ETMP resources, including network addresses and connection information for UUTs 220, video matrix switch 250, ETMP configurators/executors 260, ETMP executors 270, network-based remote control 228 and network-based power control 230. In various embodiments, ETMP master controller 232 may query ETMP database 234 for such information when managing control requests for ETMP resources. ETMP database 234 may also store ETMP test programs, as well as results of executed ETMP test programs and test operations. ETMP database 234 may further store historical metrics, such as remote control response times and/or other performance metrics obtained from UUT 220. ETMP database 234 may still further store historical data describing operational conditions of UUT 220, such as internal performance data indicative of processing resources utilized by UUT 220. It is noted that various other elements in ETMP 170 may be configured to access ETMP database 234, as desired.

Figure 7:
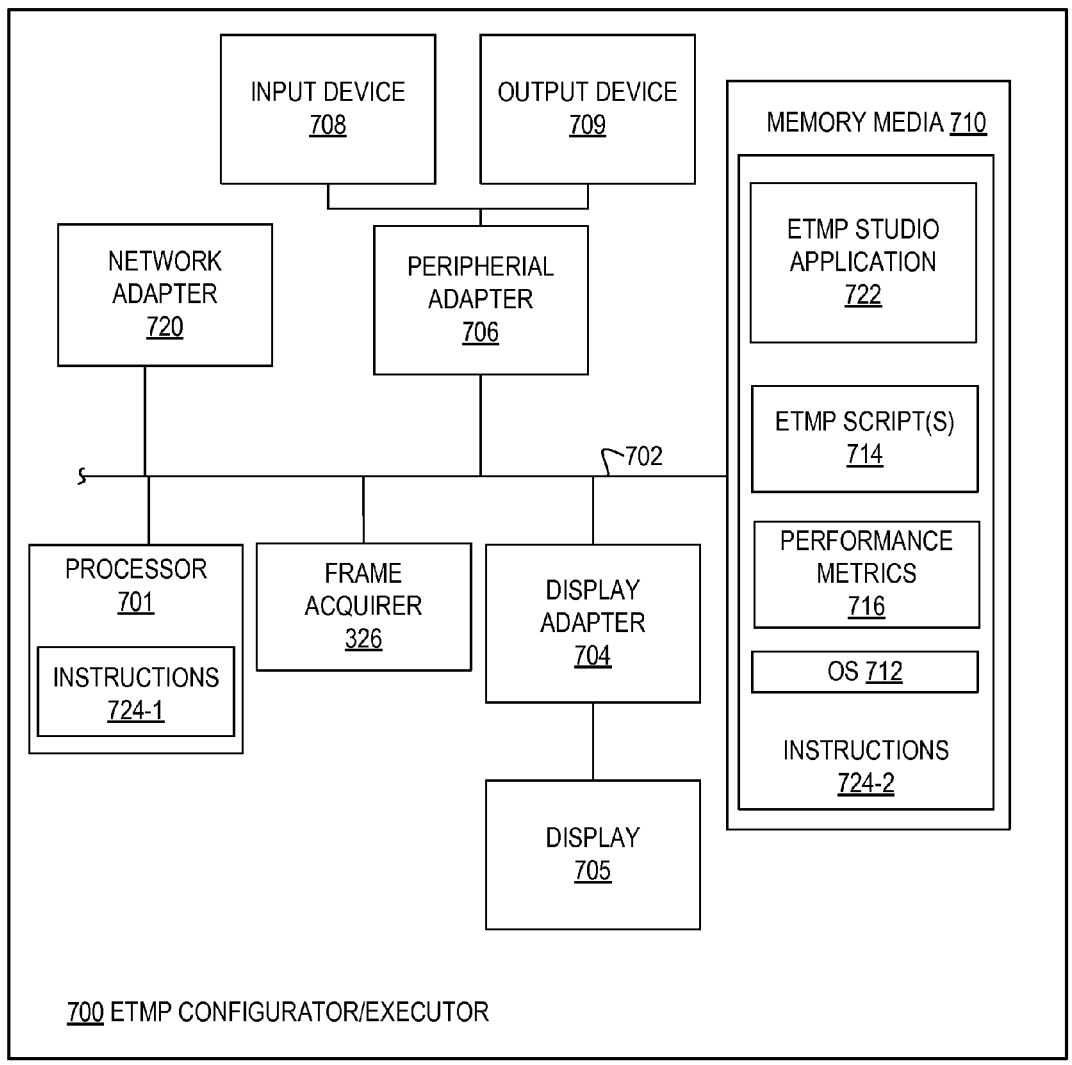
FIG. 7 is a block diagram of selected elements of an embodiment of an ETMP configurator/executor.

In operation of ETMP 170, a user may access ETMP configurator/executor 260-1 to perform test operations on UUT 220-1 (see also ETMP studio application 720 in FIG. 7). The user may first send a control request to ETMP master controller 232 for access to UUT 220-1. After the control request has been approved and access to UUT 220-1 has been assigned to ETMP configurator/executor 260-1, ETMP configurator/executor 260-1 may query ETMP database 234 for network addresses and configuration information associated with UUT 220-1. Using a queried network address, the user may send a network command using ETMP configurator/executor 260-1 to network-based power control 230 to power up UUT 220-1. ETMP configurator/executor 260-1 may also be used to send a network command to network-based remote control 228 to select a particular video channel for output by UUT 220-1 (i.e., MHD 225-1). ETMP configurator/executor 260-1 may also be used to send a network command to video matrix switch 250 via switch link 254-1 (an output from MHD 225-1) to an input of ETMP configurator/executor 260-1 via link 256-1. The input to ETMP configurator/executor 260-1 may be at frame acquirer 326 (i.e., frame grabber) (see FIGS. 3 and 7), which may be configured to acquire a video and/or audio portion of the selected video channel that has been routed via video matrix switch 250. The acquired audio/video may be used to perform a test operation, which may generate a test result. The user may also activate recording of test operations performed using ETMP configurator/executor 260-1. The recorded test operations may be stored in ETMP database 234 as an ETMP test program, that may be retrieved at a later time and executed using ETMP executor 270.

Furthermore, ETMP 170 may be operable to characterize an operational performance of UUT 220, and in particular, of MHD 225. Specifically, a baseband video signal generated by MHD 225 may be monitored by frame grabbing to generate a series of video frames. The video frames may be assigned a timestamp. Then, a remote control command may be sent to MHD 225 when a first timestamp is taken. The remote control command may be determined by user input, for example, at ETMP studio application 720 (see FIG. 7), for controlling the video signal presented by MHD 225. The video frames from the video signal output by MHD 225 may be analyzed for an indication of an expected response to the remote control command. When the expected response to the remote control command is detected, a second timestamp may be taken. A difference may then be calculated between the second timestamp and the first timestamp, which may be used to generate a remote control response metric for MHD 225. In certain embodiments, this procedure may be repeated over a number of iterations of obtaining the first and second timestamp to obtain an average value for the remote control response metric, along with other statistical values (e.g., deviation, variance, distribution, mode, etc.). In addition, internal performance data for MHD 225 may also be queried at certain intervals. The internal performance data may be indicative of processing resources utilized by MHD 225 during operation. The processing resources may include processor utilization, physical memory usage, virtual memory usage, and storage device utilization, among others. The remote control response metrics and the internal performance data may be logged to ETMP database 234, to generate historical performance metrics (also referred to as 'historical metrics') and historical performance data (also referred to as 'historical data'), respectively. Then, the historical metrics and/or the historical data may be queried from ETMP database 234 to perform analyses and to determine correlation(s) of certain operation features or conditions of MHD 225 with observed performance metrics. It is noted that additional information relating to an operating condition of MHD 225 may be recorded and used for analyses. For example, an indication of a version release of MHD 225, including hardware and/or software version information, may be recorded and used for correlation with the historical metrics and/or historical data. In this manner, when a certain performance anomaly at MCDN client 120 is observed and reported by a user of MCDN 100, a body of knowledge regarding performance of MHD 225 may be maintained and be made available to identify root causes and, in turn, provide insight for problem solutions and remediation.

Figure 3:
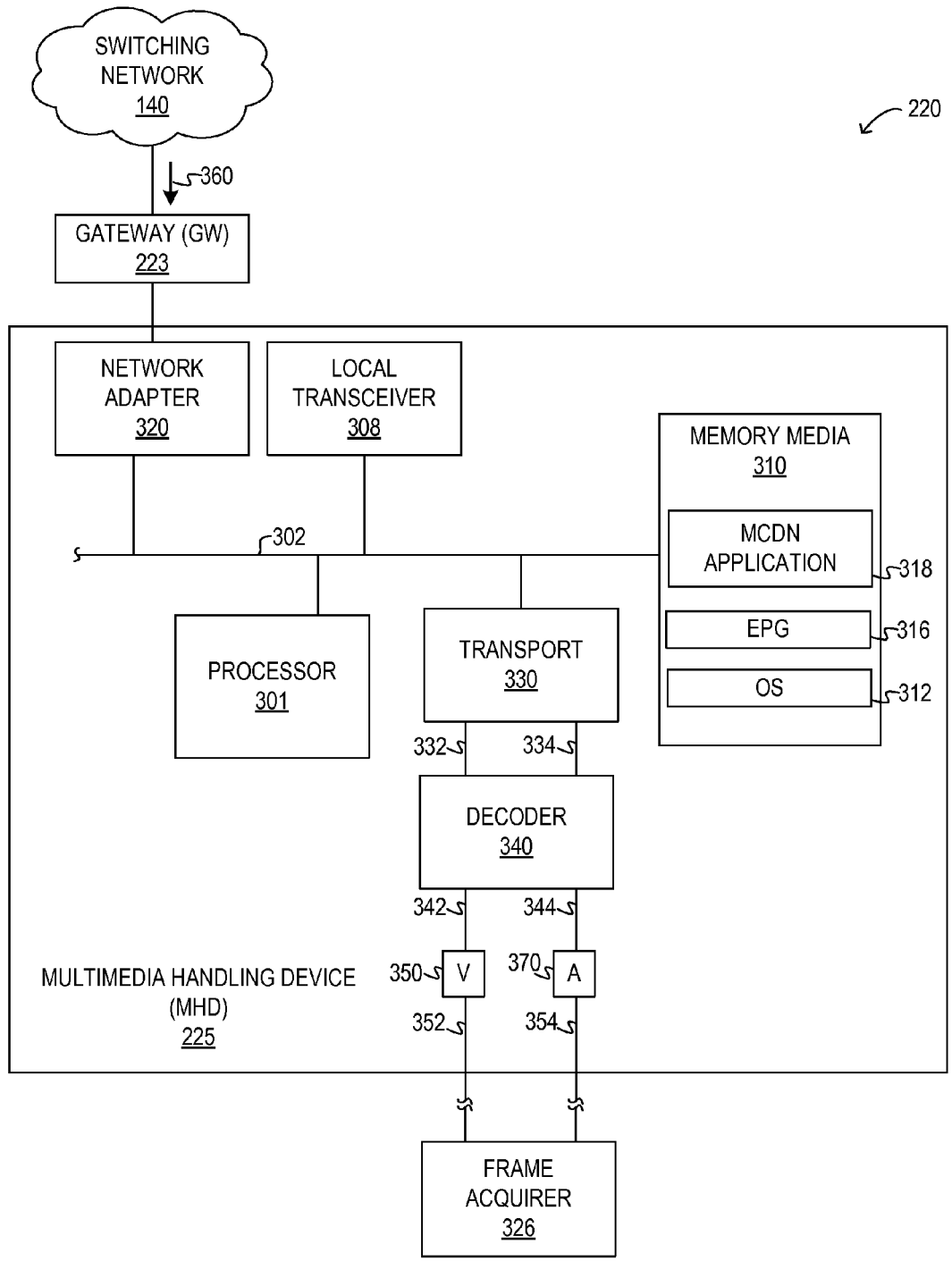
FIG. 3 is a block diagram of selected elements of an embodiment of a multimedia handling device (MHD)

Referring now to FIG. 3, a block diagram illustrating selected elements of an embodiment of UUT 220, including further details of MHD 225, is presented. UUT 220 may be configured to execute remote control commands and to output a baseband video signal, as mentioned above. In FIG. 3, MHD 225 is shown as a functional component of UUT 220 along with GW 223, which is shown receiving multimedia content 360 from switching network 140. It is noted that UUT 220 may represent functionality similar to that provided to clients 120 and, in particular, may receive substantially the same multimedia content 360, as received by clients 120 (see FIG. 1). In this manner, UUT 220 may serve as a realistic and accurate representation of clients 120 within ETMP 170 for test monitoring purposes, as described herein.

In the embodiment depicted in FIG. 3, MHD 225 includes processor 301 coupled via shared bus 302 to storage media, collectively identified as memory media 310. MHD 225, as depicted in FIG. 3, further includes network adapter 320 that interfaces MHD 225 to switching network 140 via GW 223 and through which MHD 225 receives multimedia content 360. GW 223 is shown providing a bridge to switching network 140, and receiving multimedia content 360 from switching network 140.

In embodiments suitable for use in IP-based content delivery networks, MHD 225, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, other tuning resources (not explicitly depicted in FIG. 3) may be used to "filter" desired content from other content that is delivered over the coaxial medium simultaneously and these tuners may be provided in MHD 225. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce video and audio signals 352 and 354 in a format compliant with a display, as mentioned previously. Since MHD 225 is configured for test monitoring within ETMP 170, a display may be omitted from UUT 220. Video and audio signals 352 and 354, which may be referred in aggregate to as the "baseband video signal," may represent analog signals, digital signals, or a combination thereof, in different embodiments. In FIG. 3, video and audio signals 352 and 354 are shown being ultimately routed to frame acquirer 326 (see also FIG. 7), which may be associated with ETMP configurator/executor 260 and/or ETMP executor 270. The routing of video and audio signals 352 and 354 to frame acquirer 326 may be accomplished using video matrix switch 250 (see FIG. 2) and associated connections (see links 254, 256 in FIG. 2), as described above.

Memory media 310 encompasses persistent and volatile media, fixed and removable media, and magnetic and semiconductor media. Memory media 310 is operable to store instructions, data, or both. Memory media 310 as shown may include sets or sequences of instructions and/or data, namely, an operating system 312, EPG 316, and MCDN application 318. Operating system 312 may be a UNIX or UNIX-like operating system, a Windows® family operating system, or another suitable operating system. In some embodiments, memory media 310 is configured to store and execute instructions provided as services to UUT 220 by application server 150, as mentioned previously. For example, MCDN application 318 may represent a combination of various sources of multimedia content that have been combined and generated as an output channel by application server 150 (see also FIG. 4).

EPG 316 represents a guide to the multimedia content provided to UUT 220 via MCDN 100, and may be output as an element of the user interface. The user interface may include a plurality of menu items arranged according to one or more menu layouts, which enable operation of MHD 225 using a remote control.

Local transceiver 308 represents an interface of MHD 225 for communicating with external devices, such as a remote control or network-based remote control 228 (see FIG. 2). Local transceiver 308 may provide a mechanical interface for coupling to an external device, such as a plug, socket, or other proximal adapter. In some cases, local transceiver 308 is a wireless transceiver, configured to send and receive IR or RF or other signals. In some implementations local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Figure 4:
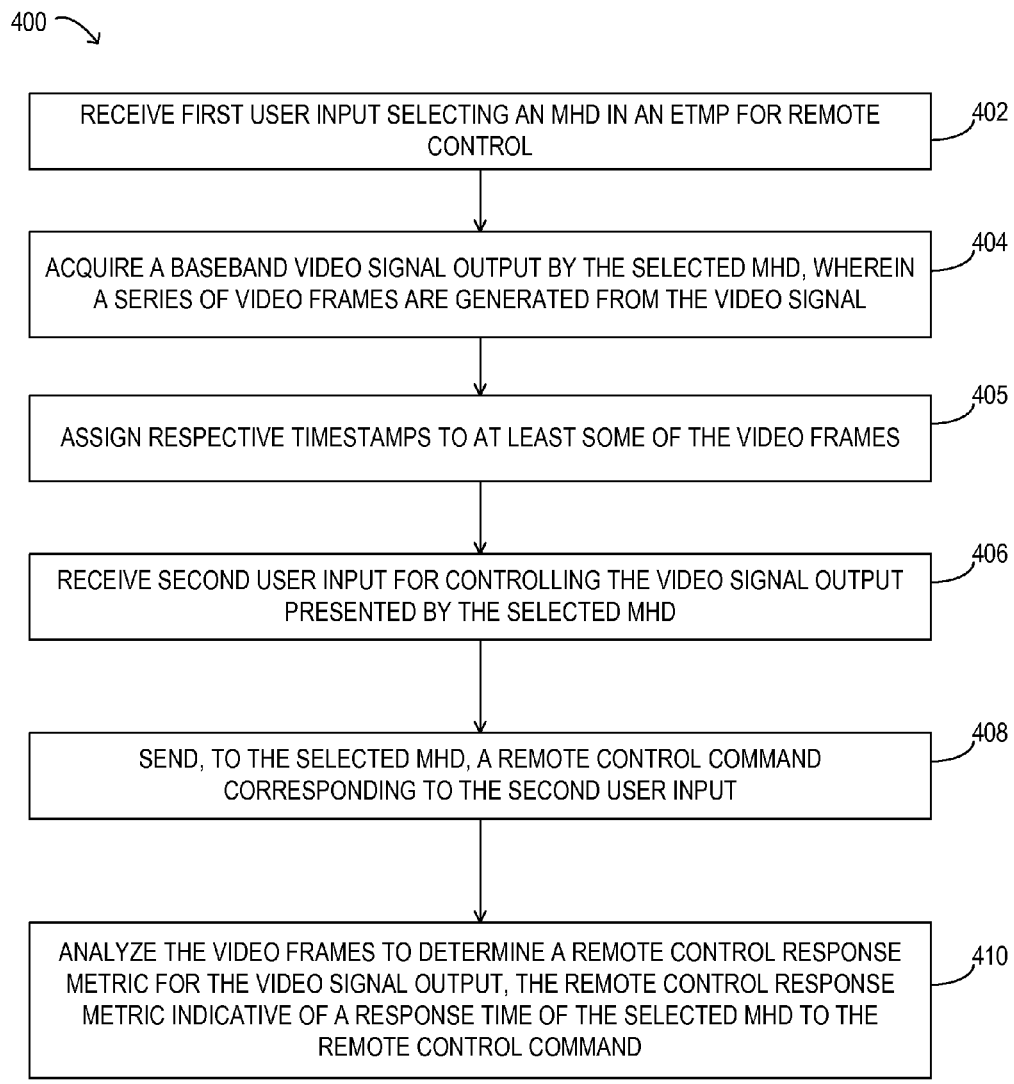
FIG. 4 illustrates selected elements of an embodiment of an MCDN video monitoring method.

Turning now to FIG. 4, selected elements of an embodiment of a method 400 for monitoring an MCDN output channel is illustrated in flow chart form. In one embodiment, method 400 may be performed by ETMP 170 (see FIGS. 1, 2). In particular, method 400 may represent an example of obtaining a remote control response metric, as discussed above. It is noted that certain operations described in method 400 may be optional or may be rearranged in different embodiments.

In method 400, first user input selecting an MHD in an ETMP for remote control may be received (operation 402). A baseband video signal output by the selected MHD may be acquired (operation 404), wherein a series of video frames are generated from the video signal. The video frames may be generated by frame acquirer 326 (see FIGS. 3, 7), which may also be configured to generate a timestamp for each respective video frame. Respective timestamps may be assigned (operation 405) to at least some of the video frames. Second user input may be received (operation 406) for controlling the video signal output presented by the selected MHD. A remote control command corresponding to the second user input may be sent (operation 408) to the selected MHD. The video frames may be analyzed (operation 410) to determine a remote control response metric for the video signal output, whereby the remote control response metric may be indicative of a response time of the selected MHD to the remote control command.

Figure 5:
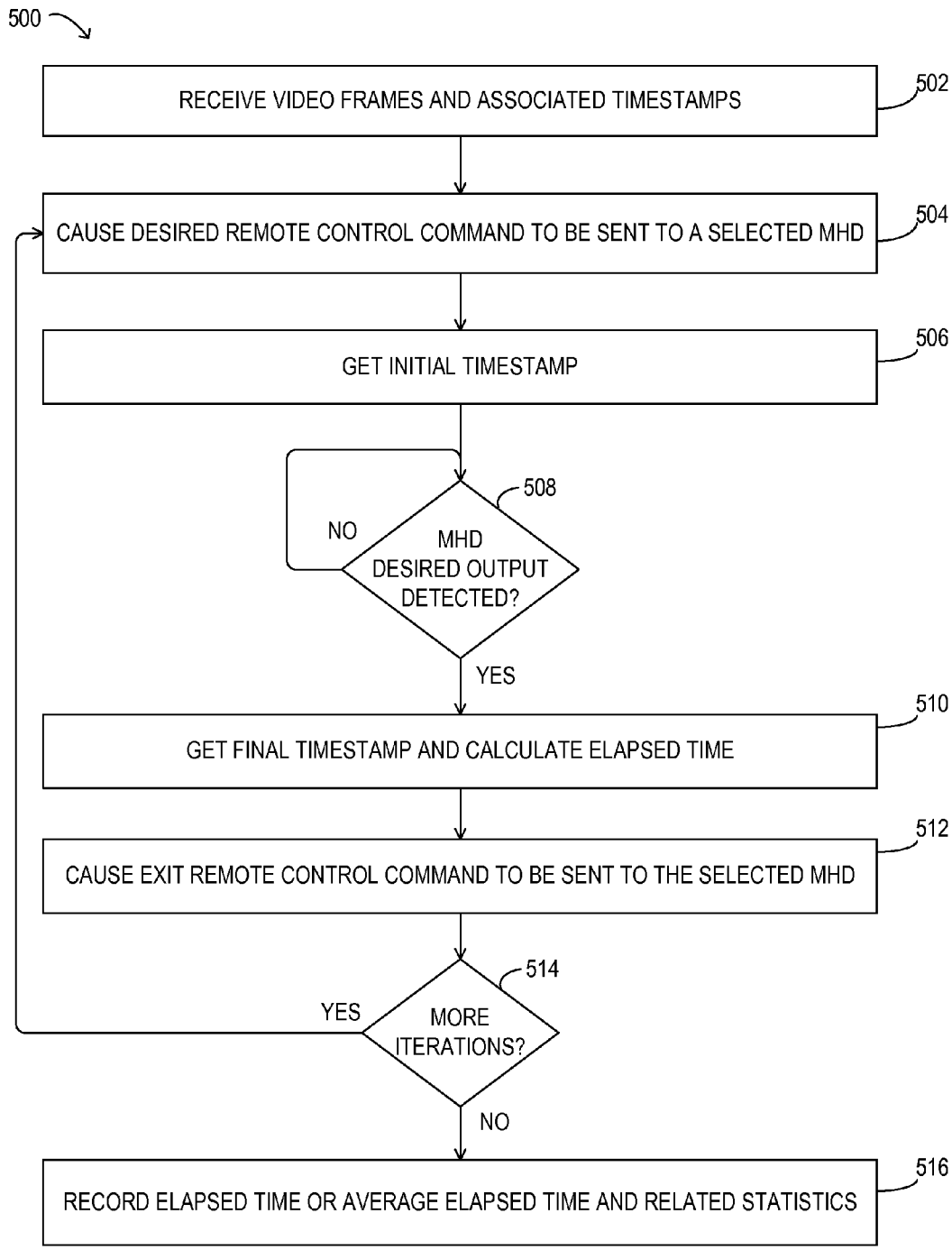
FIG. 5 illustrates selected elements of another embodiment of an MCDN video monitoring method.

Turning now to FIG. 5, selected elements of an embodiment of a method 500 for monitoring of MCDN output channels are illustrated in flow chart form. In one embodiment, method 500 may be performed by ETMP 170 (see FIGS. 1, 2). In particular, method 500 may represent an example of an iterative process for generating a video performance metric for MHD 225 (see FIGS. 2 and 3), as described above. It is noted that certain operations described in method 500 may be optional or may be rearranged in different embodiments.

Method 500 may begin by receiving (operation 502) video frames and associated timestamps. The video frames may be obtained from a video signal output presented by MHD 225 (see FIGS. 2 and 3). Method 500 may then cause a desired remote control command to be sent (operation 504) to a selected MHD. The desired remote control command may be indicative of user input. The remote control command may be associated with EPG 316 presented at MHD 225 (see FIG. 3). For example, the remote control command may be a guide command, a menu command, an information command, or a channel selection command, among other EPG commands. The audio signal and the video signal may represent a baseband video signal generated by an MHD of an MCDN in response to a channel selection at the MHD. Method 500 may then get (operation 506) an initial timestamp. It is noted that operations 504 and 506 may be executed substantially simultaneously.

Next in method 500, a determination may be made (operation 508) whether the desired MHD output has been detected. The determination in operation 508 may be made by analyzing the video frames for an indication of an expected video output. When the result of operation 508 is NO, operation 508 may be repeated. It is noted that method 500 may place a maximum value on the number of times operation 508 is repeated (not shown in FIG. 5). When the result of operation 508 is YES, method 500 may get (operation 510) a final timestamp and calculate an elapsed time. The final timestamp may be a video frame timestamp for a first video frame that exhibits the expected video output. The elapsed time may be a difference between the final and initial timestamps. Method 500 may then cause an exit remote control command to be sent (operation 512) to the selected MHD. Next, a determination may be made (operation 514) whether more iterations are to be performed. When the result of operation 514 is YES, method 500 may loop back to operation 504. When the result of operation 514 is NO, then the elapsed time or average elapsed time may be recorded (operation 516) along with other related statistics. The average elapsed time may be determined over a number of iterations that the result of operation 514 was YES.

Figure 6:
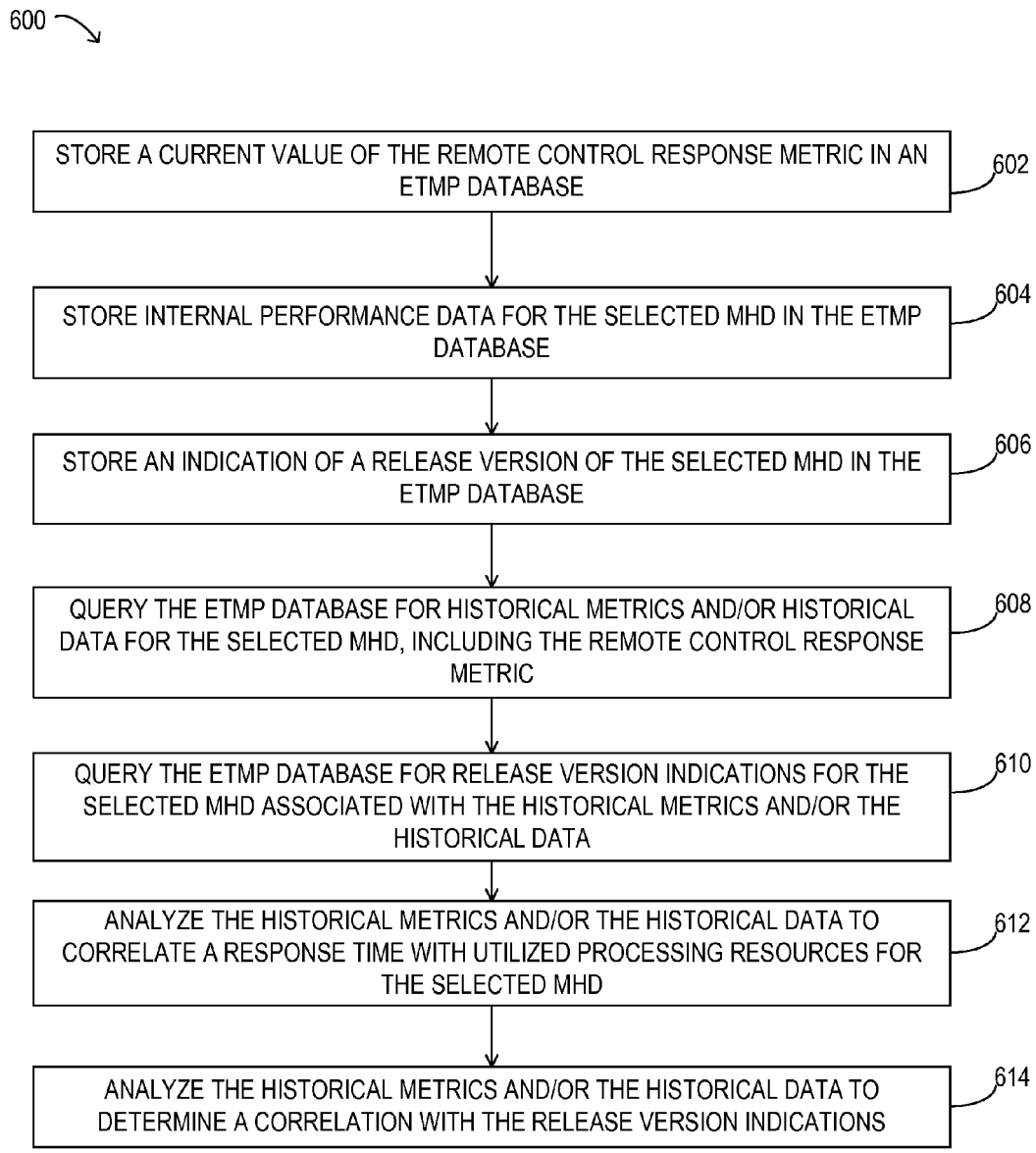
FIG. 6 illustrates selected elements of another embodiment of an MCDN video monitoring method.

Turning now to FIG. 6, selected elements of an embodiment of a method 600 for monitoring an MCDN output channels are illustrated in flow chart form. In one embodiment, method 600 may be performed by ETMP 170 (see FIGS. 1, 2). In particular, method 600 may represent an example of storing and analyzing performance metrics and performance data, as discussed above. It is noted that certain operations described in method 600 may be optional or may be rearranged in different embodiments.

A current value of the remote control response metric may be stored (operation 602) in an ETMP database. Internal performance data for the selected MHD may be stored (operation 604) in the ETMP database. An indication of a release version of the selected ETMP may be stored (operation 606) in the ETMP database. Then, the ETMP database may be queried (operation 608) for historical metrics and/or historical data for the selected MHD, including the remote control response metric. The historical metrics may include a plurality of values for the remote control response metric, and other performance metrics, that have been collected over a period of time. The historical data may include a plurality of values for internal performance data indicative of processing resources utilized by the selected MHD that have been collected over a period of time. The ETMP database may further be queried (operation 610) for release version indications for the selected MHD associated with the historical metrics and/or the historical data. The association may be a common period of time over which the information has been collected. The historical metrics and/or historical data may be analyzed (operation 612) to correlate a response time with utilized processing resources for the selected MHD. In certain embodiments, a greater amount of processing resource utilization may be indicative of longer response time of MHD 225 to remote control commands. The analysis in operation 612 may accordingly reveal a quantifiable relationship between such values. The historical metrics and/or the historical data may be analyzed (operation 614) to determine a correlation with the release version indications. In given instances, a release version of MHD 225 may be associated with a certain level of performance, performance degradation, resource utilization, or other operational characteristic. The analysis in operation 614 may thus reveal a dependency of a release version on the operational performance of MHD 225. It is further noted that the analyses in method 600 may be used to determine whether MHD 225 is operating normally or in an exceptional condition.

Referring now to FIG. 7, a block diagram illustrating selected elements of an embodiment of ETMP configurator/executor 700 is presented. ETMP configurator/executor 700 may represent ETMP configurator/executor 260 and/or ETMP executor 270 (see FIG. 2) in various embodiments. As shown in FIG. 7, multiple instances of ETMP configurator/executor 700 may be configured for use in conjunction with a given ETMP 170 facility. The elements of ETMP configurator/executor 700 depicted in FIG. 7 may be physically implemented as a single, self-contained device. In certain implementations, ETMP configurator/executor 700 may alternatively be implemented using a number of different devices that are physically separated, but coupled together for centralized control. It is noted that ETMP configurator/executor 700 may include additional components, such as a power supply and a cooling element, which have been omitted from FIG. 7 for clarity. As shown in FIG. 7, ETMP configurator/executor 700 may operate in conjunction with ETMP 170 (see also FIGS. 1 and 3) to execute the methods and operations described herein. In certain embodiments, ETMP configurator/executor 700 may represent a virtualized computing environment, wherein certain elements depicted in FIG. 7 are shared or represent virtualized components.

In the embodiment depicted in FIG. 7, ETMP configurator/executor 700 includes processor 701 coupled via shared bus 702 to storage media collectively identified as memory media 710. ETMP configurator/executor 700, as depicted in FIG. 7, further includes network adapter 720 that interfaces ETMP configurator/executor 700 to a network (not shown in FIG. 7), such as ETMP network 240 (see FIG. 2). In embodiments suitable for use with ETMP 170, ETMP configurator/executor 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

ETMP configurator/executor 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a TV or the like. Display 705 may comply with a display standard for computer monitors and/or TV displays. Standards for computer monitors include analog standards such as VGA, XGA, etc., or digital standards such as DVI and HDMI, among others. A TV display may comply with standards such as NTSC, PAL, or another suitable standard. Display 705 may include one or more integrated speakers to play audio content.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712, performance metrics 716, ETMP script(s) 714, and ETMP studio application 722. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. ETMP script(s) 714 may represent a sequence of test operations or test programs, for example, that represent functionality for characterizing remote control response performance, as described herein. ETMP script(s) 714 may be generated using ETMP studio application 722, which may provide ETMP configurator functionality. ETMP script(s) 714 may also be executed using ETMP executor functionality. Performance metrics 716 may represent remote control response metrics, and other metrics, as described above. Performance metrics 716 may be generated by, and analyzed by, ETMP studio application 722. ETMP studio application 722 may be configured to perform various aspects of the methods described herein, including method 400 (see FIG. 4), method 500 (see FIG. 5), and method 600 (see FIG. 6).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
acquiring a baseband video signal output by a multimedia handling device installed in a test monitoring platform of a multimedia content distribution network responsive to receiving first user input selecting the multimedia handling device;
generating a remote control command; and
analyzing the video frames and corresponding timestamps to determine a remote control response metric indicative of a response time of the multimedia handling device to the remote control command.

2. The method of claim 1, wherein generating the remote control command includes generating the remote control command while the multimedia handling device is displaying an electronic program guide.

3. The method of claim 2, wherein the video signal output presented by the multimedia handling device includes content selected from: electronic programming guide content; broadcast program content; live feed program content; video-on-demand program content; pay-per-view program content; previously recorded program content; and Internet content.

4. The method of claim 1, wherein analyzing the video frames includes:
determining an average of the remote control response metric over a number of iterations.

5. The method of claim 1, further comprising:
storing a current value of the remote control response metric to a test monitor database; and
comparing the current value of the remote control response metric to historical values for the remote control response metric.

6. The method of claim 5, further comprising:
obtaining internal performance data indicative of processing resources utilized by the multimedia handling device to the test monitor database.

7. The method of claim 6, further comprising:
analyzing historical remote control response metrics and the historical internal performance data to determine a correlation between remote control response time and utilized processing resources.

8. A test monitor platform, comprising:
a processor;
a network adapter accessible to the processor;
a computer readable storage medium, including stored processor-executable instructions, which when executed by the processor cause the processor to perform operations comprising:
sending the remote control command to a multimedia handling device coupled to the testing monitoring platform;
receiving a baseband video signal output by the multimedia handing device, wherein the signal includes a series of video frames; and
determining, based on the video frames and corresponding video frame timestamps, a video performance metric indicative of a remote control command response time of the multimedia handling device to the remote control command.

9. The test monitor platform of claim 8, wherein sending the remote control command is responsive to user input indicative of the remote control command and wherein the operations include:
generating a test monitor script indicative of the user input; and
storing the test monitor script in a test monitor database.

10. The test monitor platform of claim 9, wherein the operations include:
saving the video performance metric in the test monitor database.

11. The test monitor platform of claim 9, wherein the operations include:
storing internal performance data indicative of processing resources utilized by the multimedia handling device.

12. The test monitor platform of claim 9, wherein the operations include:
querying the test monitor database for historical video performance metrics and historical internal performance data;
querying the ETMP database for release version indications associated with the historical video metrics; and
determining a correlation between the historical video performance metrics and the historical internal performance data to determine a correlation with the release version indications.

13. The test monitor platform of claim 8, wherein the operations include:
determining an average value of the video performance metric over a number of iterations.

14. The test monitor platform of claim 8, wherein;
sending the remote control command is responsive to user input indicative of the remote control command; and
the user input includes a duration over which the video frames are analyzed.

15. A computer readable memory including stored processor executable instructions, which when executed by the processor, cause the processor to perform operations including:
receiving a baseband video signal from a multimedia handling device, the based band video signal including a series of video frames;
responsive to receiving user input for controlling multimedia output presented by the multimedia handling device, sending a remote control command corresponding to the user input to the multimedia handling device;
obtaining a first timestamp when the remote control command is sent;
monitor the baseband video signal for an expected video frame associated with the remote control command;
when the expected video frame is detected, obtain a second timestamp associated with the expected video frame; and
record a response time for the multimedia handling device corresponding to a difference between the second timestamp and the first timestamp.

16. The memory of claim 15, wherein the operations include:
requesting a master controller of the test monitor platform for access to a unit-under-test multimedia handling device; and
in response to receiving access to the unit-under-test:
sending, via the test monitor platform, a first network command to power on the unit-under-test;
sending, via a remote control, a second network command to select an output channel for the unit-under-test; and
sending a third network command to route the output channel of the unit-under-test.

17. The memory of claim 15, wherein the operations include:
    calculating the response time as an average value based on a plurality of iterations of respective first and second timestamps.

18. The memory of claim 15, wherein the operations include:
    indicating a duration for monitoring the baseband video signal.

19. The memory of claim 15, wherein the operations include:
    storing the response time to a test monitor database;
    storing internal performance data to the test monitor database, the internal performance data indicative of processing resources utilized by the multimedia handling device; and
    storing an indication of a release version of the selected multimedia handling device to the database.

20. The memory of claim 19, wherein the operations include:
    querying the test monitor database for historical performance metrics including the response time; and
    determining a correlation between values of the response time and the release version indications.

* * * * *